(12) United States Patent
Anthru et al.

(10) Patent No.: US 9,043,839 B2
(45) Date of Patent: May 26, 2015

(54) MEDIA CONTENT SPATIAL NAVIGATION

(75) Inventors: Shemimon Manalikudy Anthru, Dayton, NJ (US); Jens Cahnbley, Princeton Junction, NJ (US); David Anthony Campana, Princeton, NJ (US); David Brian Anderson, Florence, NJ (US); Ishan Mandrekar, Monmouth Junction, NJ (US); Dhruba Jyoti Baishya, Emeryville, CA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/578,933

(22) PCT Filed: Feb. 15, 2011

(86) PCT No.: PCT/US2011/000273
§ 371 (c)(1),
(2), (4) Date: Aug. 14, 2012

(87) PCT Pub. No.: WO2011/102891
PCT Pub. Date: Aug. 25, 2011

(65) Prior Publication Data
US 2012/0311637 A1    Dec. 6, 2012

Related U.S. Application Data

(60) Provisional application No. 61/306,343, filed on Feb. 19, 2010.

(51) Int. Cl.
*H04N 5/445* (2011.01)
*H04N 21/235* (2011.01)
(Continued)

(52) U.S. Cl.
CPC .............. *H04N 5/445* (2013.01); *H04N 21/235* (2013.01); *H04N 21/4126* (2013.01);
(Continued)

(58) Field of Classification Search
CPC   H04N 21/431; H04N 21/482; H04N 21/4828
USPC ........................................ 725/37–61
See application file for complete search history.

(56) References Cited

U.S. PATENT DOCUMENTS 5,917,488 A * 6/1999 Anderson et al. ............. 715/838
5,983,224 A   11/1999 Singh et al.
(Continued)

FOREIGN PATENT DOCUMENTS

JP       2010128633       6/2010
WO       WO03043335       5/2003
WO       WO2005022377     3/2005

*Primary Examiner* — Pankaj Kumar
*Assistant Examiner* — Timothy Newlin
(74) *Attorney, Agent, or Firm* — Robert D. Shedd; Jerome G. Schaefer

(57) ABSTRACT

A method and system of providing a content guide that identifies a spatial relationship between the elements in the content guide is described. A controller receives electronic program guide data. The received electronic program guide data is parsed to identify a plurality of programs listed in the electronic program guide and data corresponding to at least one program description attribute for the identified programs. A relationship is determined between each identified program based on the at least one program description attribute. At least one cluster is generated and includes at least one of the plurality of identified programs based on the determined relationship. A user interface display processor generates a user interface display image representing a clustered content guide and including the at least one generated cluster enabling the user to view the relationship of the plurality of programs.

12 Claims, 8 Drawing Sheets

(51) Int. Cl.
*H04N 21/41* (2011.01)
*H04N 21/431* (2011.01)
*H04N 21/435* (2011.01)
*H04N 21/45* (2011.01)
*H04N 21/84* (2011.01)
*H04N 21/472* (2011.01)

(52) U.S. Cl.
CPC ...... *H04N 21/4312* (2013.01); *H04N 21/4314* (2013.01); *H04N 21/435* (2013.01); *H04N 21/4508* (2013.01); *H04N 21/472* (2013.01); *H04N 21/84* (2013.01)

(56) References Cited

U.S. PATENT DOCUMENTS

| | | | |
|---|---|---|---|
| 7,213,256 B1 * | 5/2007 | Kikinis | 725/53 |
| 7,533,093 B2 | 5/2009 | Gutta et al. | |
| 2002/0059603 A1 * | 5/2002 | Kelts | 725/47 |
| 2005/0251821 A1 * | 11/2005 | Pina | 725/39 |
| 2006/0020970 A1 * | 1/2006 | Utsuki et al. | 725/39 |
| 2006/0184966 A1 | 8/2006 | Hunleth et al. | |
| 2007/0064811 A1 * | 3/2007 | Zador et al. | 375/240.26 |
| 2008/0104058 A1 | 5/2008 | Billmaier et al. | |
| 2008/0320515 A1 | 12/2008 | Sloo | |
| 2009/0064227 A1 * | 3/2009 | Eronen et al. | 725/46 |
| 2010/0050211 A1 | 2/2010 | Seldin et al. | |

* cited by examiner

MEDIA CONTENT SPATIAL NAVIGATION

CROSS-REFERENCE TO RELATED APPLICATIONS

This application claims the benefit, under 35 U.S.C. §365 of International Application PCT/US2011/000273 filed Feb. 15, 2011 which was published in accordance with PCT Article 21(2) on Aug. 25, 2011 in English, and which claims the benefit of U.S. Provisional Patent Application No. 61/306,343 filed on Feb. 19, 2010.

FIELD

The present arrangement provides a system and method for organizing and displaying electronic program guide data.

BACKGROUND

Conventionally, a subscriber to a cable or satellite provider accesses content using a set top box connected to a display device. When selecting content to be accessed at a given time, the user may employ an electronic program guide (EPG) that is displayable on a screen in response to receipt of a user generated of a control signal using a remote control. The EPG typically is a tabular formatted user interface that presents a listing of channels and information about programs on those channels for a given time period. The guide information displayed in the EPG user interface is sparse due to the limited screen real estate of the display device. Therefore, the guide is only able to display limited information about respective programs. For example, current EPG's merely list the program name, start and end time, a brief description, cast list, and possibly a rating (as in a television program guide TV-PG).

Additionally, the EPG data is displayed to the user in a linear fashion organized by channel and by time. While cable/satellite operators have attempted to improve EPG guide navigation by grouping channels that are known to broadcast similar types of content. For example, a cable provider may set aside a block of channels that are known to broadcast sports content and a separate group that are known to broadcast home improvement or comedy content. While channel groupings have improved the ability of the user to find content that may be interesting, this method of content organization is limiting because a user is only able to view the limited programming on the set of channels at a given time. A drawback associated with accessing the content available is that it can be a tedious task for a consumer/user to sort through and locate content that may be interesting to them and aggregate it in a meaningful manner. Therefore, there is a need to improve the surfing speed of the electronic program guide that enables faster selection of content derived from a larger set of content spread across multiple sets of channels.

SUMMARY

An aspect of the invention includes an enhanced program guide that enables the user to browse and select media content, such as television programs, more quickly and efficiently.

In one embodiment, a method of providing a content guide that identifies a spatial relationship between the elements in the content guide is described. A controller receives electronic program guide data. The received electronic program guide data is parsed to identify a plurality of programs listed in the electronic program guide and data corresponding to at least one program description attribute for the identified programs. A relationship is determined between each identified program based on the at least one program description attribute. At least one cluster is generated and includes at least one of the plurality of identified programs based on the determined relationship. A user interface display processor generates a user interface display image representing a clustered content guide and including the at least one generated cluster enabling the user to view the relationship of the plurality of programs.

In another embodiment, a system for providing a content guide identifying a spatial relationship between the elements in the content guide. A receiver receives electronic program guide data. An attribute processor parses the received electronic program guide data to identify a plurality of programs listed in the electronic program guide and data corresponding to at least one program description attribute for the identified programs. A cluster processor determines the relationship between each identified program based on the at least one program description attribute and generates at least one cluster including at least one of the plurality of identified programs based on the determined relationship. A user interface display processor generates a user interface display image representing a clustered content guide and including the at least one generated cluster enabling the user to view the relationship of the plurality of programs.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
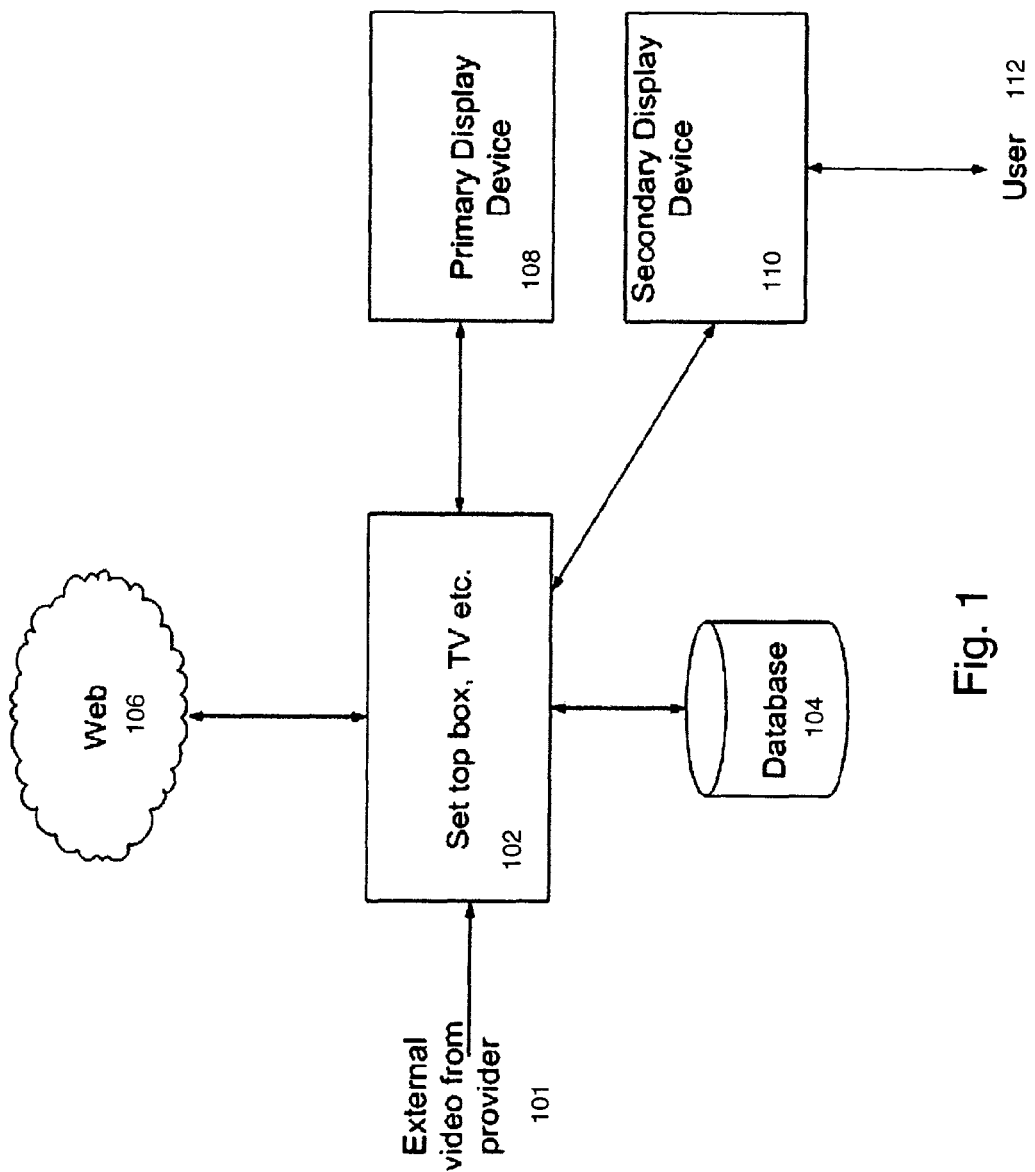
FIG. 1 is an illustrative view of a system that generates a clustered program guide in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices (such as power supplies, drivers, etc.) are omitted from the block diagrams in order to facilitate describing the embodiments.

As used in this application, the term "component" is intended to refer to hardware, or a combination of hardware and software in execution. For example, a component can be, but is not limited to being, a process running on a processor, a processor, an object, an executable running on a processor, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and nonvolatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

It should be noted that any hyperlinks used herein are used for purposes of example only. These hyperlinks may or may not be active and may or may not contain data. Any data stored at the location corresponding to any hyperlink is not required for an understanding of the present invention.

Content providers provide access to different types of content to a plurality of users. For example, cable/satellite providers typically rent set top boxes to consumers which act as a portal or gateway for the delivery of different types of content. The equipment that selectively provides access to content advantageously accesses content guide data that can be decoded and displayed to a user on a display device. Content guide data includes a listing of at least one channel on which content may be accessed and information associated with the content on the at least one channel. An example is electronic program guide data (or electronic service guide data) that is delivered either directly inbound from the cable provider through the same channel as the broadcast data or through an added internet service that compiles and provides content guide data. The content guide data typically contains minimal information that describes the programs on particular channels at particular times due to bandwidth limitations and the large number of programs for which data is required. Additionally, the content guide is highly inefficient for browsing content because, as the number of available programs increases, the linear navigation of the content guide data increase in difficulty. For example, the user's overhead in guide navigation increases as the number of available programs increases in a linear search guide.

While the content guide typically contains minimal information, much more information is available from various other sources which, if harnessed, could be used in producing a comprehensive content program guide that includes significantly more information than currently available in conventional program guides. This additional information could advantageously improve the user's experience in guide navigation and content selection by improving the surfing speed of a guide, providing faster selection of content out of a large available set, and providing faster perception of a whole guide.

The present system is able to improve content guide data presentation and navigation using the relatedness of the content to create hierarchical groupings of content. Content, including (but not limited to) television programs or any other media programs, may be related to each other in numerous ways. Hierarchical grouping of programs is challenging and may result in overlapping of content between groups. Thus, the present system advantageously generates clusters of related pieces of content from a set of available content by considering all dimensions to which the content belongs. For example, content may be described using a plurality of different attributes that include information at least one of describing and associated with the content and a dimension of the piece of content is defined by the information contained in the attribute. The present system advantageously clusters all of the content in the set of content to represent how the programs in the set are related to each other. A level of relatedness between two programs may be determined by the number of matching attributes associated therewith. Upon creating the clusters of related programs, data representing a respective one of the plurality of clusters is automatically displayed to a user. The present system further advantageously enables the user to navigate content contained within the cluster of programs (e.g. vertical navigation) as well as navigate between the clusters (e.g. lateral navigation). Therefore, the additional information associated with the content may be used to enhance the display of content guide data to the user while improving navigation thereof.

One exemplary embodiment of the system is shown in FIG. 1 which includes a set top box 102, for example a cable television set top box, including a tuner module that selectively tunes an input signal 101 from a cable/satellite provider. Set top box 102 parses received program data, including program guide data, and populates a database 104 with attributes that are associated with respective programs available to be tuned by the tuner module. In this embodiment, the database may be embodied as a separate disc drive or a cloud database storage location accessible via a communication network. In an alternate embodiment, the database 104 may be embodied within the set top box 102. The structure of the database may have various tables that represent a particular time period of a day. In the respective tables, attributes used to describe content may be provided in the columns and the programs at that particular time period may be provided in the rows. As used herein, content includes television programs available from a cable/satellite provider. However, one skilled in the art would appreciate that content may be any audiovisual multimedia data that a user may access in any manner.

An example of a set of attributes for each program at a particular time period that may be populated by the system include, but is not limited to:

Title;
Subtitle;
Description;
Synopsis (generally implies a longer description);
Cast (actors, presenters, directors, narrators, producers);
Images (screen shots, posters, box art, thumbnail);
Genre/category;
Ratings and Advisories (e.g., PG-13);
Reviews and Star Ratings;
Other episodes of the same program;
Online sources of information (the show/episode on Hulu, Fancast, Netflix . . . );
Related movies and shows;
Date of original airing;
Series data; and
Data describing topics/situations depicted in the program.

The system may obtain these, and other attributes, from a plurality of different sources including, but not limited to:

Electronic Program Guide provider (such as schedules direct);
Set Top Box (by querying the STB, the STB can have obtained the information from the content provider);
Cable/Satellite/FIOS™ feed;
Preferred Content Provider based search (for example, querying providers about their content such as querying Disney™ about Disney™ content, or Comcast™ about Comcast™ content, etc.);
Internet Searches: Google™, Bing™, Wikipedia™ and others expose search APIs. These can also be crawled independently;
DVR/PVR; and
Media Content on user's home network.

In the system embodiment of FIG. 1, the set top box 102 is coupled to a primary display device 108, for example a high definition television monitor, which selectively displays content corresponding to the signal tuned by the tuner module in the set top box 102. While a set top box 102 is described as the access point enabling selection and viewing of content, it should be noted that any device including at least one tuner module enabling selection of content may be used to implement the present system. Alternatively, the system may be implemented by any device that allows any piece of content to be selected and provided to a user in any manner. A secondary display device 110 may be provided for display of the clustered content guide generated by the system. The secondary display device 110 may be any computing device that has access to at least one of a local area network and wide area network and which can access and receive data representing the enhanced content from the set top box 102 for display thereon. Secondary display device 110 includes but is not limited to, a computer, a laptop, a netbook, a tablet computer, a cellular phone, a smart phone or a second monitor different from the primary display device 108.

The set top box 102 is controlled by a user 112 or other device (e.g. a VCR, a DVR, another tuner, etc) in a known manner, for example using a remote control (not shown), to cause the set top box 102 (or primary display device 108) to display a user interface including an electronic program guide on the primary display device 108. The program guide data includes information that describes the plurality of programs that are available to be tuned at a give time. In creating the clustered program guide for display on either the primary display device 108 or the secondary display device 110, program guide data and any other data identifying and/or describing program content are parsed by the system to retrieve attributes therefrom and populate the cluster content guide database 104. The system may automatically parse the EPG and other data upon receipt and in advance of the present time frame in order to populate the cluster content guide database 104 in advance. For example, the system may parse the EPG data the night before to ensure set top box performance and display of data is not hindered when a user is actually viewing program content on the primary display device 108.

The following is an exemplary description of how a clustered EPG is caused to be displayed on at least one of the primary display device 108 and the secondary display device 110. In this exemplary embodiment, a user 112 may generate a control signal requesting that the electronic program guide be displayed. The set top box 102 queries the electronic service guide from the electronic service guide source, such as the content data stream or a web site provided by the content provider, to derive description information in the form of attributes that are associated with all programs that are currently available. For each program that may be currently available, at least one type of attribute data is used as input into an attribute search module executing on set top box 102. The attribute search module searches information providers located on the web 106 for information that is related to the program to combine with the attribute data derived from the EPG and generate an enhanced set of program attributes which are stored in database 104. A cluster processor (FIG. 8) embodied within a controller 800 of a set top box 102 selects at least one type of attribute data representing a single dimension of the program and executes a hierarchical clustering algorithm to generate at least one cluster comprising a set of related programs that are related and which are currently available for viewing on at least one the primary display device 108 or the secondary display device 110. A cluster includes a set of programs that are determined to be related to one another. Data representing the at least one generated cluster is formatted by a user interface display processor (FIG. 8) for display to the user. Once displayed, the user may selectively navigate the set of programs included in the cluster as well as between different clusters which include different sets of programs that are less related to one another.

Figure 2:
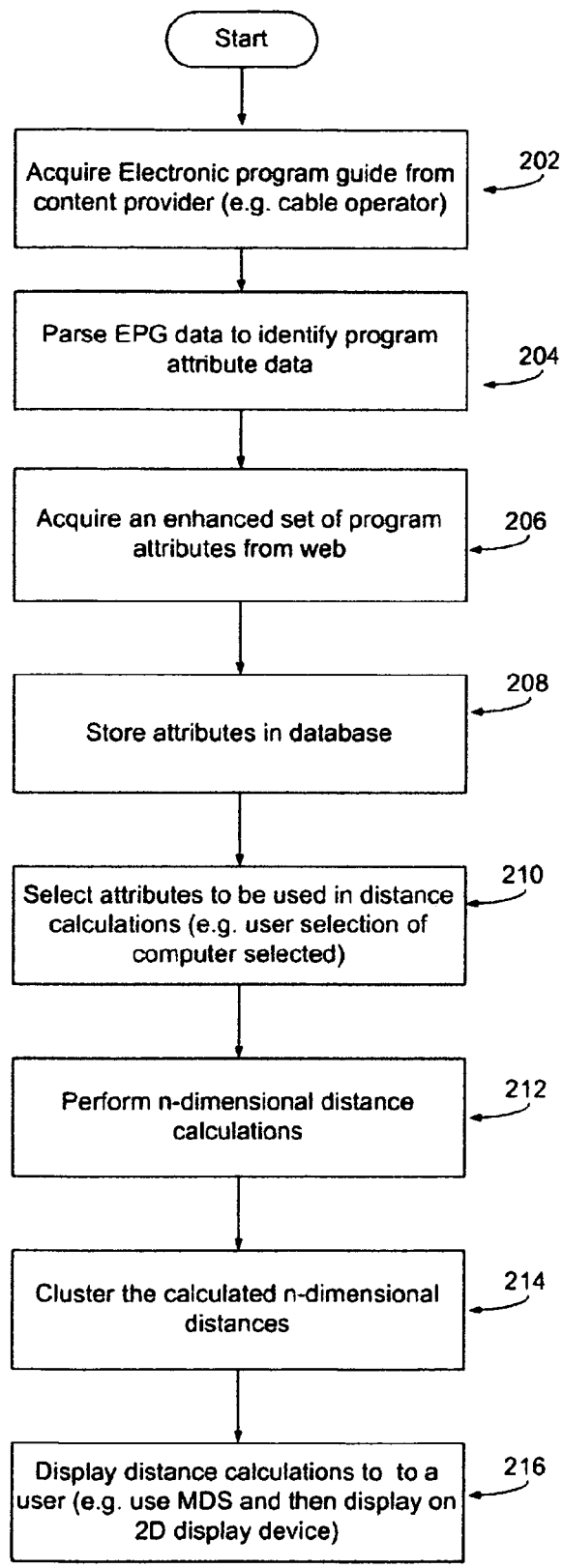
FIG. 2 is an exemplary flow diagram detailing an algorithm for generating the clustered program in accordance with an aspect of an embodiment.

FIG. 2 is a flow diagram detailing an exemplary operation of the system described in FIG. 1 using the references numerals set forth therein. This embodiment describes the mechanism by which data is acquired to generate the clustered EPG data. In one embodiment, the processes/activities described herein are performed in advance of receiving a control signal identifying a program as the selected program thereby reducing the time needed to acquire related content information and generate a UI including the related content information. In another embodiment, the processes/activities described herein are performed in response to receipt of a control signal selecting content from within an EPG on the primary display or secondary display devices.

In step 202, EPG data is acquired from a source of EPG data, such as the content data stream or a web site having content provider related data, and parsed to identify a set of unique programs that are available to be tuned over a given time period. The whole program list may be obtained from the EPG data available on a cable/satellite feed or any other external service provisioned for this. For each unique program identified, a program identifier is assigned thereto and the database 104 is populated with a set of unique program identifiers enabling creation of records to which attribute data describing the program can be populated. The list of available programs is hereinafter referred to as a "Sample Set" which may identify a plurality of different programs that are available for viewing during a given time period. The sample set may be derived by filtering out duplicates programs from the entire list of programs. For example if two channels are airing HD and SD versions of the same content, then the filter module outputs only one program node to represent both.

The system further parses the EPG data in step 204 using a set of predetermined attributes contained in the EPG database 104 to identify data corresponding to respective attributes for each program during the given time period. The attribute data is automatically used to populate the fields of the EPG database for each program. Program attribute data include descriptive keywords associated with each program. For example, program attribute data may include but is not limited to the (a) title; (b) sub title; (c) genre; (d) cast; (e) duration; (f) position in series; and (g) plot line description data.

As noted above, the EPG data received by the system may include a limited amount of data to be used in populating the attribute data fields for each program. Thus, in step 206, the attribute set can be further enriched by making use of other data resources available via global communication systems, for example, the Internet. In step 206, an attribute search module executing on the attribute processor (FIG. 8) uses data corresponding to at least one attribute for the program as a seed term to initiate a search of related information providers located on a communication network 106 to acquire supplementary attribute data associated with the program. The acquired supplementary attribute data may be used to populate predetermined attribute fields that were not populated during the parsing of the EPG data. Additionally, during the search of related information providers, the system may acquire information identifying types of attributes that were not included in the predetermined set of attribute data. In this instance, the additional types of attributes may be automatically incorporated in the set of predetermined attributes stored in database 104. Data corresponding to newly added attribute types may also be acquired by the attribute processor that executes an attribute search module and used to populate the data fields in the database 104.

In one embodiment, the attribute sets for each program may be further revised by the attribute processor that applies a filtering algorithm that removes non-words from the acquired data. For example, a filtering algorithm may remove non-words such as "and", "or", "of", "the" etc. In another embodiment, a filtering algorithm may parse attribute data that includes a plurality of words or a phrase. In this embodiment, the filter may automatically separate the individual words within the phrase and create a set of sub-attributes wherein each word forms a sub-attribute and may also be used as a mechanism to determine the dimensional relationship between various programs. Alternatively, the individual words of a phrase may be automatically designated as a separate attribute and used to determine the dimensional relationship between various programs as discussed below.

Examples of information providers include but are not limited to Wikipedia™, IMDB™ or any other source including information about audiovisual program data. In the present example, the attribute search module automatically searches Wikipedia™ for the show's root article(s). The attribute search module may utilize a proprietary search mechanism and algorithm or may use a third party search web service such as provided by Google™ or any other internet search provider.

Data corresponding the types of attributes in the set of attributes is stored in the database 104 in step 208. In one embodiment, the system pre-queries the data ahead of time, such as a day ahead of the current program, and stores the data for later use, for example in a database. This database can be filled with the enhanced information on a regular basis, such as once per day, and the program guide then only accesses this database when access to the external data source is not possible or limited in some aspect. This database can then be exposed as a web service or network API. The database can be located inside a home in a set top box and/or gateway, to allow multiple devices to access the data locally, and/or in the cloud to offer the information to a number of customers as a service.

In step 210, the attribute processor (FIG. 8) selects at least one attribute from the set of attributes stored in database 104 for determining a level of relatedness of all programs in the sample set of programs at the given time. Each attribute selected corresponds to a dimension of relatedness of the programs. The selection of attributes by the attribute processor may be performed automatically based predetermined sets of attributes. In another embodiment, the selection of attributes may be determined in response to a user generated control signal that identifies which attributes are to be used to determine the level of relatedness of the sample set of programs at the given time.

Once the attribute set of all programs is generated in step 210, the cluster processor (FIG. 8) executes a dimensional distance calculation algorithm in step 212 to determine the level of relatedness of the set of programs based on the selected attribute set. The cluster processor converts the set of attributes into distance vectors. The set of attributes is identified as the "Complete Attribute Set" given by the union of all attributes of the all of the programs in the "Sample Set".

For example, Table 1 below provides an example of how the level of relatedness may be calculated whereby the attributes (A0-An) in the Complete Attribute Set as listed in the columns and each program in the Sample Set of Programs (P0-P2) is listed in the rows. The first row provides the listing of the attributes in "Complete Attribute Set" and the following rows provide a distance vector of each program.

TABLE 1

| Program | A0 | A1 | A2 | ... | An |
|---------|----|----|-----|-----|-----|
| P0 | 1 | 0 | 0.9 | | 0 |
| P1 | 0 | 1 | 0 | | 1 |
| P2 | 0 | 0 | 1 | | 1 |

As shown herein, the numerical value of 1 shows the presence of an attribute and 0 shows the absence. A value between 1 and 0 gives the presence of the attribute and its position at which it belongs on the relational vector. Related attributes can be better represented by assigning relative weights for them. For example, typical TV program ratings like "TV-MA", "TV-G" and "TV-14" all can count as different dimensions in a distance vector even though they are related. It could be said that "TV-14" rated programs are closer to "TV-MA" rated programs and far from "TV-G". In order to account for these relations, a range of values is assigned to the rating, ranging from 0 to 1.

1-------------0.8------------0.5-------------0.3-------------0
"TV-MA"   "TV-14"                    "TV_G"

In the above relational vector, 1 and 0 represents two extremely far apart ratings and all other ratings get a value corresponding to the distance they have from each end. This way a single numerical value of rating attribute that goes to a distance vector can still represent its distance from other ratings. For example, Equation 1 represents a formula for calculating the distance vector for Program P0 and Equation 2 represents a formula for calculating the distance vector for Program P1.

$$P0=1*W0+0*W1+0.9*W2+\ldots+0*Wn \quad (1)$$

$$P1=0*W0+1*W1+0*W2+\ldots+1*Wn, \quad (2)$$

where the attribute values are derived from Table 1 and W0, W1, W2 ... Wn are the weights associated with attributes A0, A1, A2 ... An. In one embodiment, the values for W0 ... Wn may be selected arbitrarily at random in order to provide better spacing when the programs are clustered by the distance vectors. In another example, the weights of attributes can be arbitrarily chosen to give better spacing of the cluster. In a further example, attributes like "genre" can be weighted higher if that gives clear separation for different categories of content within the cluster. In a still further embodiment, the weight values associated with each attribute may be selectively assigned by a user depending on the user preferences indicating the importance of the respective attribute. In yet another embodiment, the weight values for the attributes may be automatically assigned based on a user preference profile that includes program viewing history for the respective user. For example, if the set top box 102 has determined that the user likes programs that are in the genre "drama" and eschews programs that are in the genre "sports", a weight value closer to 1 may be assigned to the "drama" attribute and a weight value closer to 0 may be assigned for the "sports" attribute.

In response to calculating the distance vectors for all programs within the Sample Set based on the Complete Set of Attributes, the cluster processor (FIG. 8) executes a clustering algorithm in order to generate at least one cluster including subsets of programs contained in the Sample Set that are determined to be related to one another. The clustering algorithm may be any type of hierarchical clustering algorithm using Euclidean or non-Euclidean distances as the basis for the clustering. For example, using the distance vectors calculated according to Equations 1 and 2, one or more clusters of programs can be formed by calculating the distance between programs. In the above example, the Euclidean distance between two programs P0 and P1 is calculated in accordance with Equation 3 which provides $$d=\sqrt{(W0-0)^2+(0-W1)^2+(0.9W2-0)^2+\ldots+(0-Wn)^2} \quad (3)$$

The resulting distance calculation can be used to generate a distance matrix as shown below in Table 2. The distance matrix provides the distance of each program against each other in "n" dimensions. Hence, the cluster generated is considered an "n" dimensional cluster.

TABLE 2

|    | P0       | P1       | P2       |
|----|----------|----------|----------|
| P0 | $d_{00}$ | $d_{01}$ | $d_{02}$ |
| P1 | $d_{10}$ | $d_{11}$ | $d_{12}$ |
| P2 | $d_{20}$ | $d_{21}$ | $d_{22}$ |

Additionally, a variable of the clustering algorithm executed by the clustering processor (FIG. 8) includes a number of clusters to be generated. The number of clusters to be generated may be set in advance so that the system automatically generates the same number of clusters each time. Alternatively, the number of clusters to be generated by the clustering algorithm may be set in response to a user-generated control signal specifying the number of clusters. User specification of the number of clusters advantageously provides the user a significant degree of control regarding how the list of currently available programs may be grouped and navigated. By specifying a larger number of clusters, the user is provided multiple clusters, each cluster containing more closely related programs to one another, whereas by specifying a smaller number of clusters, the types of programs contained in the cluster are likely to vary to a certain degree from one another. More specifically, as the number of clusters decreases, the variation in relations between in programs within the cluster increases, and vice versa. In another embodiment, the number of clusters may be automatically determined based on the user navigation preferences as detected by the set top box 102. In this embodiment, if the user tends to navigate more deeply into the programs in resulting clusters, the system may determine that an additional number of clusters need to be generated when the system receives a request signal requesting EPG guide data be displayed that is generated by the user.

Once the clusters have been generated in step 214, the cluster processor applies a dimensional correction algorithm to enable the clusters which have been calculated according to n-dimensions to be accurately displayed to reflect relatedness in a two dimensional space on at least on of the primary display device 108 and secondary display device 112. Once the correction has been applied, the set top box provides data representing the generated corrected clusters to the user interface display processor (FIG. 8) to generate a display image enabling navigation within a cluster, navigation between a plurality of clusters and selection of a representative program from a particular cluster in step 216. In one embodiment, a multidimensional scaling (MDS) algorithm is used to generate a two-dimensional map of distance vectors.

Figure 3:
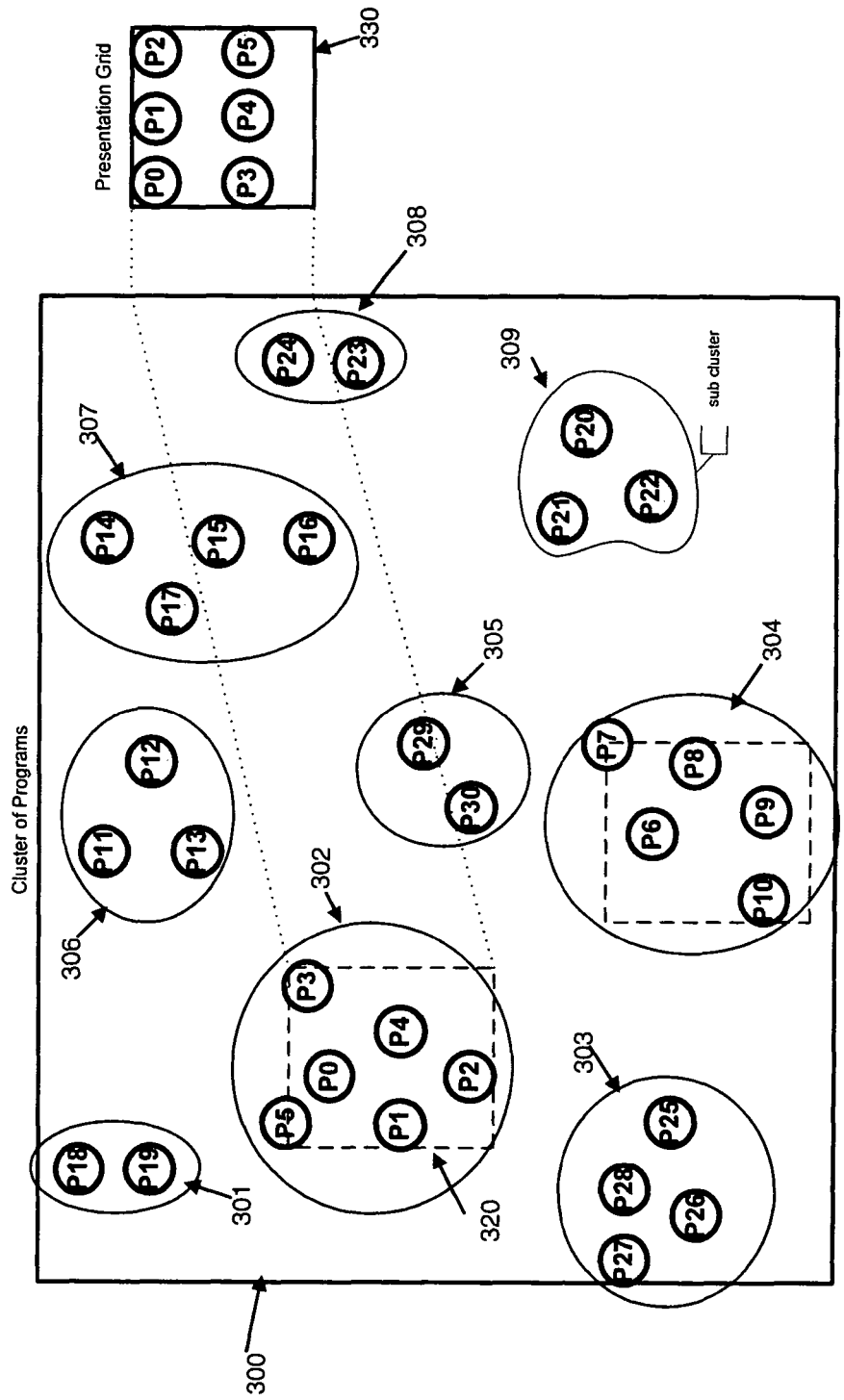
FIG. 3 is an exemplary display image of a clustered program guide in accordance with an aspect of an embodiment.

A generic example of a two dimensional display of clustered program data is shown in FIG. 3. FIG. 3 shows a two dimensional projection of the n-dimensional cluster generated according to the algorithm set forth in FIG. 2. Because there needs to be a two dimensional correction applied to the n-dimensional clustering, all of the two dimensional distances shown are an approximation of the actual "n" dimensional distances. In this example, during the given time period, there are 31 available programs represented as P0 ... P30. Each program may be considered a program node and based on the distance vector data, the clustering algorithm has generated one cluster 300 having nine subclusters contained within the circles labeled 301-309. Thus, subcluster 301 includes Program 18 and Program 19 which have been determined to be n-dimensionally related to one another based on the Complete Set of Attributes used in the algorithm.

In one embodiment, data representing cluster 300 having subclusters 301-309 may be presented for display on either a primary or secondary display device thereby showing the user a visual depiction of the types of programs available at the given time and how related these programs may be. This display image may be presented in response to receipt by the system of a user generated control signal requesting EPG guide data. The display image in FIG. 3 may include a navigation element 320 that enables highlighting of a respective subcluster. As shown herein, the navigation element is focused on subcluster 302 that includes Programs P0, P1, P2, P3, P4 and P5, Upon highlighting of subcluster 302, a more detailed view of the programs in subcluster 302 are displayed in presentation grid 330.

Presentation grid 330 may be a separate display image generated by the user interface display processor (FIG. 8) that provides additional information describing the programs in subcluster 302 as well as allowing further navigation among the programs contained in subcluster 302. The program grid 330 may be displayed simultanenously on the same display screen as cluster 300. Alternatively, the program grid 330 may be displayed on a secondary display device while the display image of the cluster 300 including all subclusters 301-309 remains on the primary display device. This arrangement advantageously provides the user with data representing the programs in the cluster while still maintaining display of all possible groupings of programs available at the given time.

Further, navigation element 320 may be caused to move between subclusters in response to a navigation signal received by the system. Should the user be unhappy with the programs in the currently highlighted cluster, using a remote control, a navigation signal may be generated and transmitted for receipt by the set top box resulting in the navigation element 320 highlighting a different subcluster. In response to navigating between subclusters, data in the program grid 330 is automatically changed to represent the programs in the newly highlighted subcluster. For example, if the navigation element 320 is caused to move from subcluster 302 to subcluster 304, the program data in program grid 330 would be for programs P6, P7, P8, P9, and P10.

Figure 4:
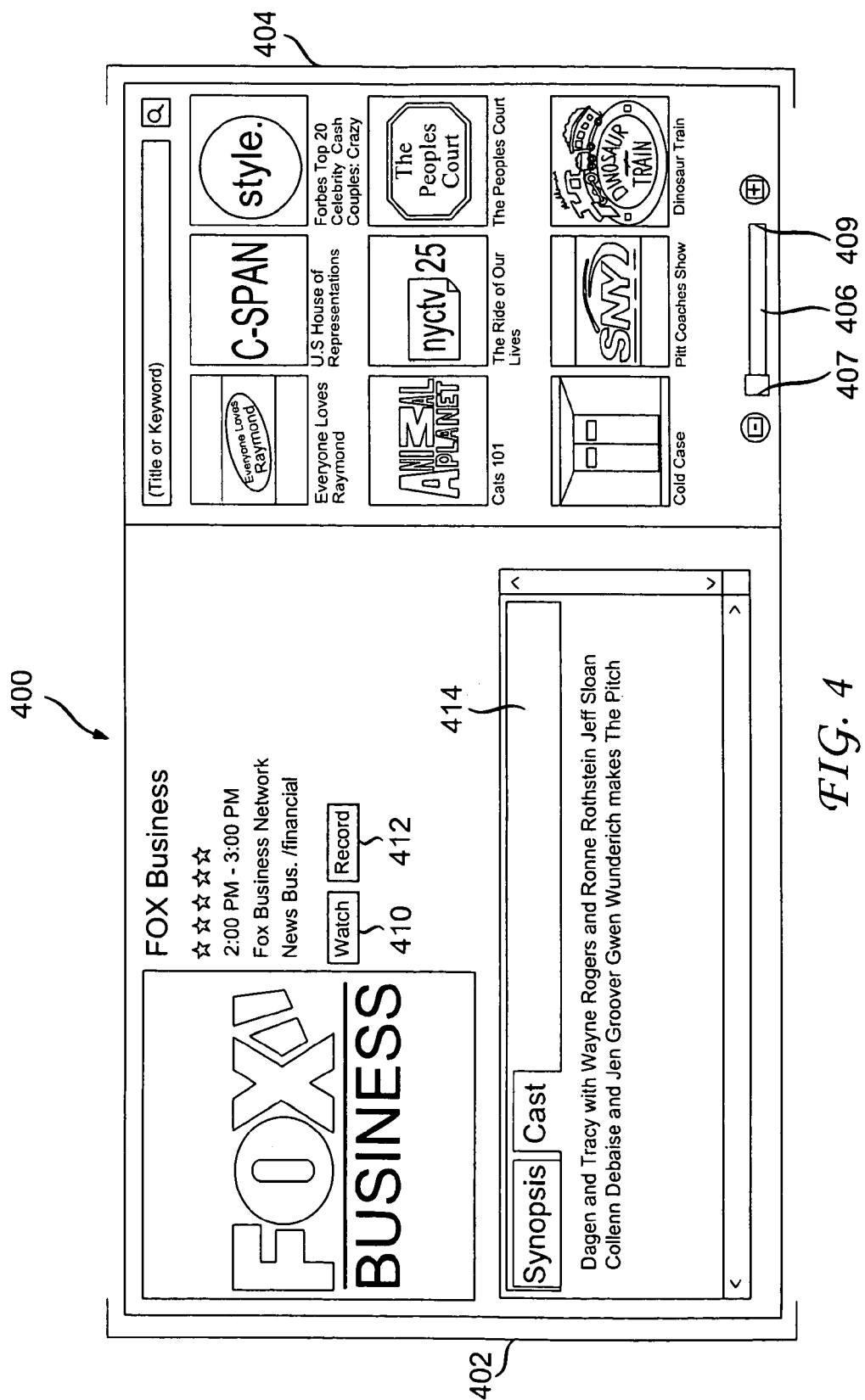
FIG. 4 is an exemplary display image of a clustered program guide in accordance with an aspect of an embodiment.

FIG. 4 shows an exemplary display image 400 of clustered EPG data shown in FIG. 3. Display image 400 representing a portion of the cluster is shown to the user in a navigational grid. The navigational grid is a user interface element which can display a grid of images. The navigation grid includes a focus node section 402 and representative node section 404. The focus node section 402 includes data representing a user selectable image element identifying an exemplary program that is available at the given time that is determined to be part of a respective subcluster. Referring back to FIG. 3, if subcluster 302 is the focus node, than an iconic representation of one of the programs subcluster 302 is displayed to the user. For any program node shown in the focus node section 402, a user selectable image element 410 enabling the user to watch the program is displayed along with a user selectable image element 412 enabling the program to be recorded. Additionally, an information section 414 including data describing the program may also be included in the focus node section 402.

The representative node section 404 includes user selectable image elements including a representative program from each of the subclusters 301-309 of FIG. 3. The representative nodes can be chosen as any program node closest to the centroid of its cluster. In this way a user can get a complete view of the guide in start-up state. The user may navigate the representative node section 404 and select a particular program causing the data in the focus node section 402 to automatically change to a program in a different subcluster. Images displayed in each of the focus node section 402 and the representative node section 404 may include images corresponding to the box-art of the program. If the box-art images are not available, a title of the program or channel icons or a combination of both may be used.

In one embodiment, the programs shown in the focus node section may be the program that is currently being tuned by the set top box 102 (FIG. 1). Alternatively, the data in the focus node may be automatically provided in response to a predetermined preference of a user. In another embodiment, the focus node can represent the currently tuned television program and data items in the representative node section 404 may include programs that have the closest n-dimensional distance to the focus node program within the given cluster.

Display image 400 further includes a sliding cluster navigation bar 406 that enables the user to modify the data shown in the display image 400. For example, if the slide control of the navigation bar is positioned at first end 407, the display image 400 will display the broadest amount of data including all of the subclusters that have been generated. If the slide control of the navigation bar 406 is moved towards a second end 409 opposite the first end, the type of data being displayed will be more focused. For example, by moving the navigation bar towards end 409, the system may determine that the representative program shown in the focus node section 402 is desired and the data in the representative node section 404 will be replaced with other programs contained within the same cluster as the focus node program.

Navigation of the exemplary program guide display image shown in FIG. 4 may be lateral whereby the user can select programs that are in different clusters as will be discussed with respect to FIG. 5 or vertical whereby the programs more closely related to the selected node are presented to the user as will be discussed with respect to FIG. 6.

Figure 5:
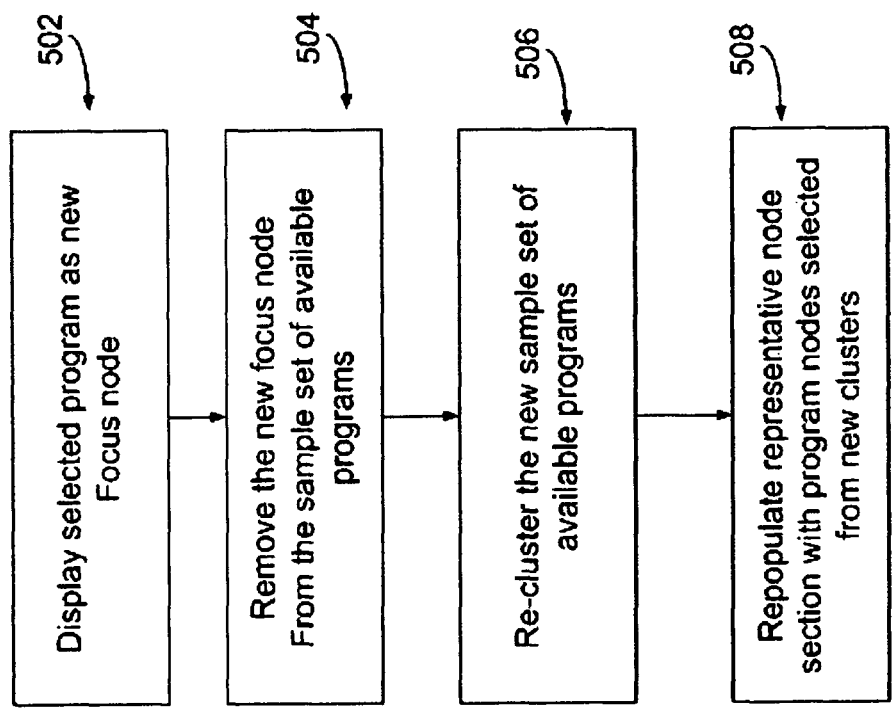
FIG. 5 is an exemplary flow diagram detailing how to navigate the clustered program guide in accordance with an aspect of an embodiment.
Figure 6:
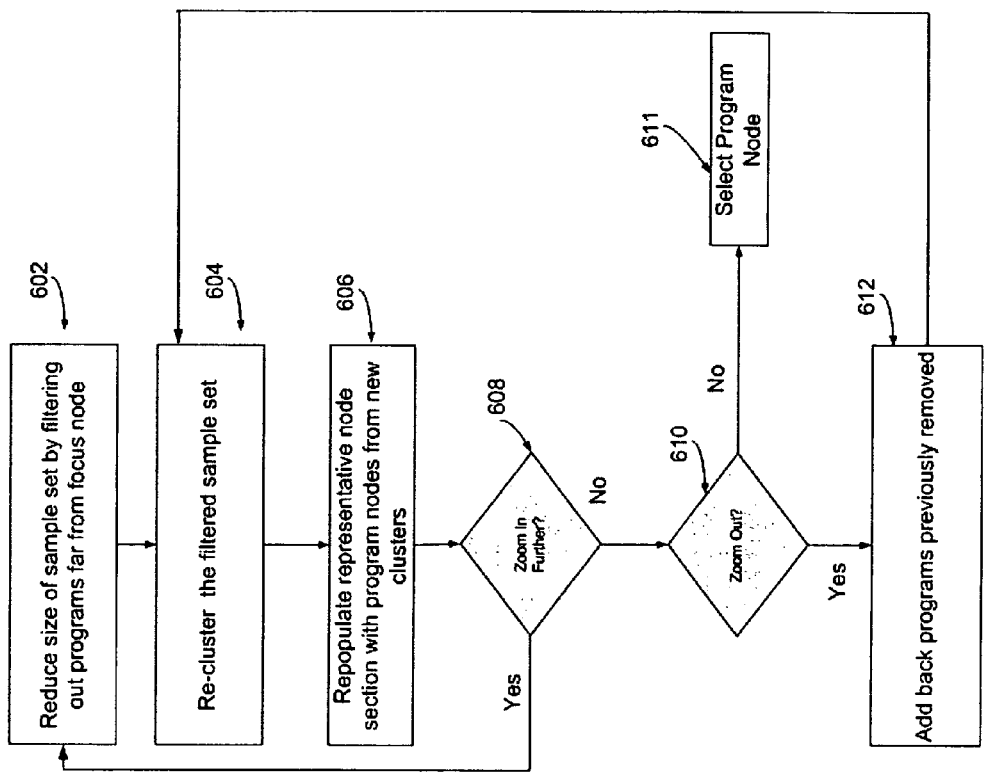
FIG. 6 is an exemplary flow diagram detailing how to navigate the clustered program guide in accordance with an aspect of an embodiment.

FIG. 5 is an exemplary algorithm implemented by the present system that allows the user to select different nodes that are shown on the grid in the representative node section 404 in FIG. 4. In one embodiment, when a program node is selected, it will become the new focus node and the program nodes in the representative node section 404 will be automatically updated to include identifiers corresponding to programs within the cluster that are closely related to the focus node program. FIG. 5 provides an algorithm that enables lateral navigation within a cluster. In step 502, the a program selected by a user is displayed as the new focus node in focus node section 402 (FIG. 4). Once selected, the cluster processor (FIG. 8) removes the focus node program from the sample set of available programs in step 504. Thereafter, the cluster processor, in step 506, automatically re-clusters the modified sample set of available programs in the manner discussed above with respect to FIG. 2. In step 508, the representative node section 404 (FIG. 4) is automatically repopulated with program node identifiers corresponding to the new clusters generated in step 506.

The user may also vertically navigate programs by selecting any program node and using the slider image element of the navigation bar 406 (FIG. 4). When the slider position element of the navigation bar 406 is at a left most position, the data items in the representative node section 404 provide a broad spectrum of different types of programs corresponding to the clusters generated by the system. As the system receives a command causing the slider position element to move towards the right, data items in the representative node section 404 are automatically replaced with program nodes that are more closely related to the focus node program. The slider element of the navigation bar 406 enables the user to "zoom in" and "zoom out" to get a broad or narrow spectrum of available programs at the given time. FIG. 6 provides an exemplary algorithm that enables the present system to modify the types of programs being displayed to a user in a vertical manner.

In step 602, the size of the sample set of available programs is automatically reduced by filtering (removing) programs from the sample set of available programs that are located at a predetermined distance away from the selected focus node program. In step 604, the cluster processor (FIG. 8) automatically re-clusters the filtered sample set of available programs. In step 606, the data items in the representative node section 404 (FIG. 4) are automatically repopulated with representative programs from the new clusters. The user is then presented with a decision to zoom in further by causing the slider position element of the navigation bar 406 to be moved further to the right in step 608. If the system receives a signal indicating the desire for further zooming (narrowing) of the relatedness of the programs in the representative node section 404, the process repeats steps 602-606. If the user does not wish to zoom in further, a further decision in step 610 is presented whereby the user can zoom back out and get a broader spectrum of programs. If the system does not receive a signal indicating that the user wishes to zoom out, the user selects a program in step 611. The selection of a program as used herein may include but is not limited to (a) changing the focus node program; (b) causing a program to be tuned for viewing on at least one of a primary or secondary display device; and (c) scheduling a recording of the program. If the decision in step 610 indicates the desire to zoom out, the system automatically adds back the programs that were previously filtered out in step 612. Once added back, the algorithm returns back to step 604 to re-cluster the sample set of available programs.

Figure 7:
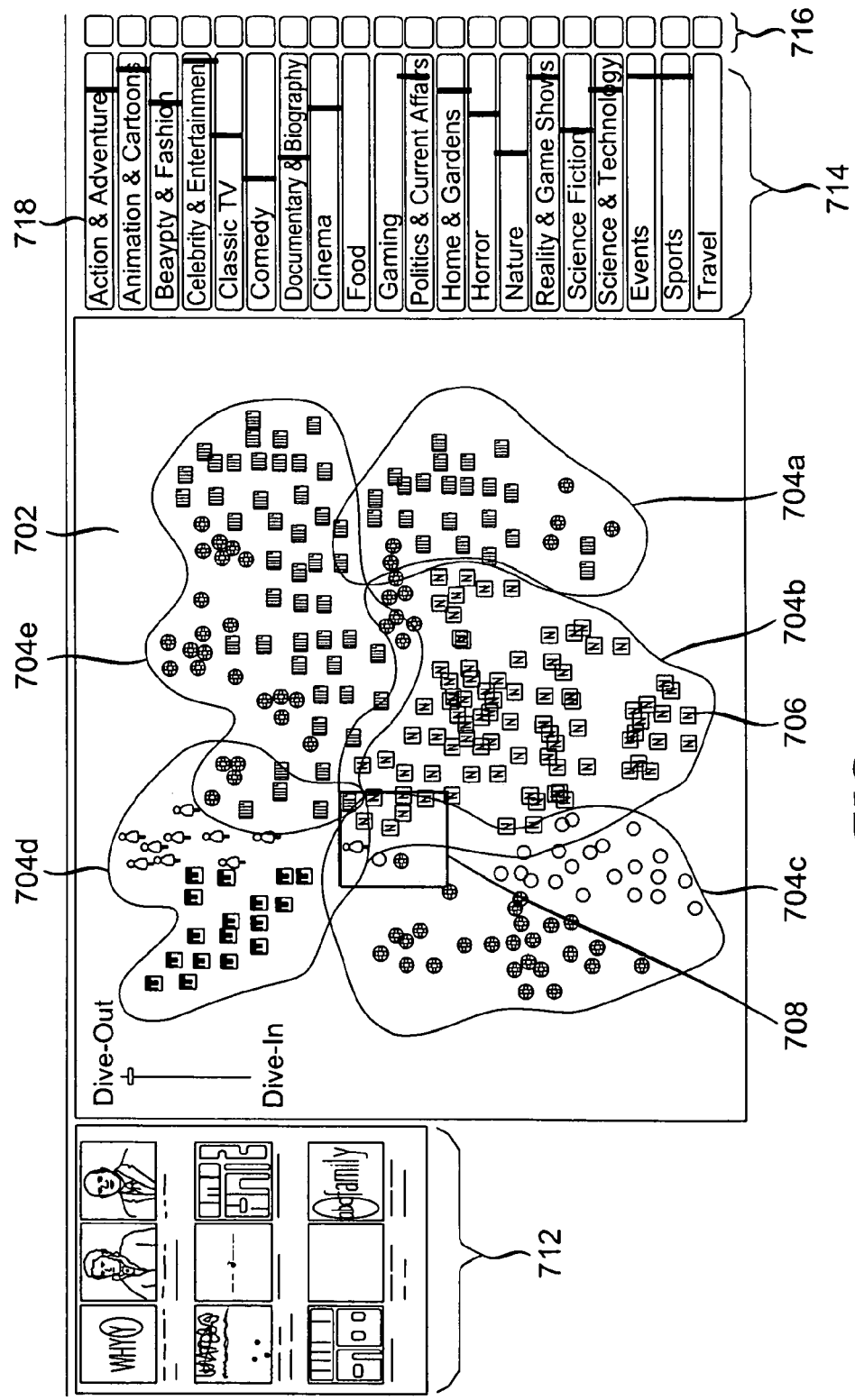
FIG. 7. is an exemplary display image of a clustered program guide in accordance with an aspect of an embodiment.

In another embodiment, the system may generate a user interface that enables the user to selectively control how the program guide will be clustered as well as the display thereof. An exemplary user interface that enables simultaneous display of cluster data as well as provides inputs for controlling the clusters being displayed is shown in FIG. 7. Once a set of clusters is generated from the sample set of available programs using the complete set of attributes, as discussed above with respect to FIG. 2, the system automatically generates a two dimensional projection of the n-dimensional clusters 702 using a multidimensional scaling (MDS) algorithm that map the "n-dimensional" distance vectors to ⅔ dimensions. The cluster projection 702 includes a plurality of different clusters 704a-704e that represent the entire set of available programs at a given time period. Each cluster 704a-704e includes at least one program node 706 represented by an icon thus enabling the viewer to visualize the relatedness of various available programs. A navigational lens 708 is provided and enables navigation among and between the clusters 704a-704e. For example, as shown in FIG. 7, the navigational lens 708 is positioned over a set of program nodes whereby some are in cluster 704c and others are in cluster 704b. Image identifiers representing program nodes that are viewable in the navigation lens 708 are automatically displayed in program display grid 712. The position of the navigation lens 708 changes on the cluster plane as the user navigates laterally. The user can also selectively move the lens 708 to anywhere in the cluster projection 702 to see that part of the cluster in the navigation grid 712. The size of the navigation lens 708 may be selectively increased or decreased using the slider bar 710. If increased, the navigation lens 708 provides a broader view of the cluster portion over which it is positioned thereby zooming out. Similarly the size of the lens 708 can be decreased to get a closer view of the cluster portions corresponding to a zoom in.

Additionally, data items in the cluster projection image 702 may be presented in a different manner according to the type of data to which it refers. For example, some of the attributes may be highlighted in the cluster projection by using colors and/or icons to give a better perception for the user. For example, if the attribute "genre" is the most heavily weighted attribute, the attributes are colored and the program type (movie, serial etc.) may be represented as a particular type of icon identifying that type of program.

The present system advantageously allows the user to automatically modify the cluster projection image 702 by modifying the set of attributes that were used to generate the clusters 704a-704e. An attribute section 714, showing a list of available attributes, is provided for simultaneous display with the cluster projection 702 and program grid 712 allowing the user to view and selectively modify the types of attributes used to generate the clusters. The attribute section 714 includes a selection section 716 that allows a user to cause an attribute to be part of the distance calculation algorithm or remove the attribute from the distance calculation algorithm. Additionally, for each attribute, a sliding bar is provided that enables the user to selectively determine a value that corresponds to the weight the attribute will receive in the distance calculation discussed above. Some of the attributes in the distance vector can be weighted higher or lower to create a better spacing of the cluster in the projection. The weights of attributes can also be chosen in real time by the user and advantageously enables the user to change the spacing of a cluster in real time. The example user interface shown in FIG. 7 allows the user to vary the weights of different attributes and see the effect on the program cluster side by side.

In one embodiment, the attribute section 714 may be displayed on a secondary display device enabling the user to modify the attributes used in generating the clusters using the secondary device. In another embodiment, the entire display image shown in FIG. 7 may be provided on a secondary display device allowing the user to navigate the available programs while still watching a currently tuned program. In yet another embodiment, when the guide display image is shown on a primary display device, the system may automatically cause the currently tuned program to be viewed on a secondary display device.

Figure 8:
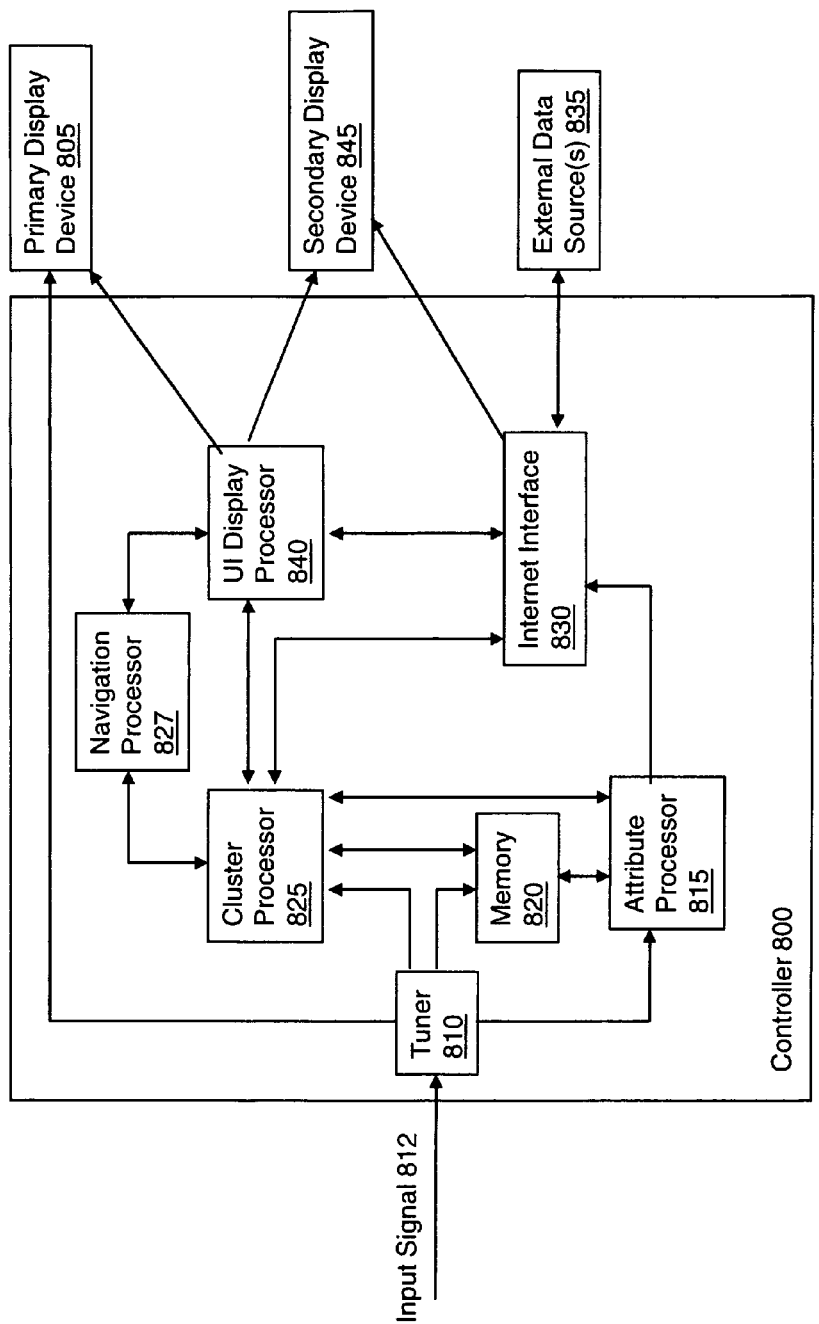
FIG. 8 is an exemplary block diagram of a system for generating the clustered program guide in accordance with an aspect of an embodiment.

FIG. 8 is a block diagram of an exemplary controller 800 embodied in the set top box (FIG. 1) that implements the system described above with respect to FIGS. 1-7. The controller 800 may be a hardware component embodied in a set top box 102 as shown in FIG. 1. The controller 800 includes a tuner 810 that selectively receives and tunes an input signal 812. The input signal may be a television broadcast signal formatted in a particular signal format such as those set forth by the Motion Pictures Experts Group (MPEG) or any other signal format used for encoding and transmitting audiovisual data and ancillary data associated with the audiovisual data. The tuner 810 decodes any ancillary data accompanying the tuned input signal 812 and stores the decoded data in a memory 820. The ancillary data may include Electronic Program Guide (EPG) data or any other data encoded and transmitted with the input signal 812. A primary display device 805 is coupled to the tuner 810 for displaying at least one of the tuned input signal and ancillary data including EPG data included in the input signal.

The memory 820 includes a data structure, such as a database, that includes a set of attributes used in describing program content. The attribute set may be predefined by the content provider (cable/satellite provider) and correspond to content characteristics that are transmitted along with the input signal that describe the various programs able to be tuned by tuner 810. The data structure in memory 820 enables each unique program listed in the ancillary data to be correlated with the plurality of attributes associated therewith which are derived from the ancillary data. In an alternative embodiment, the function of a database for the EPG function, may be located external to the controller 800. An external database (not shown), would interface to the controller 800 via a suitable interface, such as a disc drive interface or a web interface for an external drive or cloud-based database respectively.

The controller 800 further includes an attribute processor 815 coupled to both the tuner 810 and the memory 820. The attribute processor 815 automatically parses the ancillary data to identify a set of unique programs able to be tuned and which are listed in the ancillary data. A unique program identifier is assigned to each unique program and is provided to the data structure in memory 820 thereby enabling collection of an individual set of related data for each respective unique program. The attribute processor 815 also automatically parses the received ancillary data to identify information that describes the program and corresponds to at least one attribute of the set of attributes. The data structure in memory 820 is automatically populated with data values representing the attribute information derived from the ancillary data. The attribute processor 815 uses the unique program identifier to link the attribute data to the program. The parsing and populating performed by the attribute processor 815 may occur in advance of the time frame in which the ancillary data will actually be displayed to a user. For example, if the ancillary data is electronic program guide data for a particular day, the parsing and populating of the data structure in memory 820 may occur at a predetermined time prior to the particular day. Alternatively, the parsing and populating may occur in response to receipt of a selection signal from a user.

In another embodiment, the system may automatically take into consideration user preferences and past user behavior data for use as input in order to search for related content. The system may automatically track user behavior including user navigation and content selection data that can be stored in memory 820. The system can further access the user preference and navigation data to identify other potential types of related content information and content sources that are displayed to the user on the secondary display device. By considering user preferences and behavior, the attribute processor may automatically update the set of attributes in the data structure stored in memory 820 thereby enabling additional attribute data to be collected and used in searching for related content information. For example, the user-specified attributes may enable the system to prioritize an order of sources of related content information to be searched.

The attribute processor 815 may be coupled to an internet interface 830 in order to initiate an attribute search algorithm enabling acquisition of additional types of attributes to be included in the data structure in memory 820 as well as data associated with a respective unique program that corresponds to a type of attribute stored in memory 820. The attribute processor 815 queries the data structure in memory 820 to acquire attribute data which may be used to search additional sources for related content information and for sources where related content is stored. The attribute data may be used as search terms in a searching algorithm to locate information about each respective program assigned a unique program identifier. The attribute processor 815 initiates a search across at least one of a local and wide area network for information about the program. The attribute information search algorithm executed by the attribute processor 815 engages an internet interface 830 which is coupled thereto to initiate a search of external data sources 835. As used herein, external data source 835 is a generic term used to denote any source of data for any purpose. For example, external data source 835 may be a source of content information (i.e. Wikipedia™ or IMDB.com™) or a content provider (e.g. Netflix™, or Fancast.com™, etc.). Data representing the results of the search are retrieved by the attribute processor 815 and may be stored in memory 820. The search result data may be stored in a separate data structure than the attribute data but may be linked via the unique program identifiers so that the relevant data is quickly and easily retrieved when needed.

A cluster processor 825 is coupled to the attribute processor 815, memory 820, and the tune 810 and automatically executes a clustering algorithm to generate at least one cluster containing all unique programs that are available to be accessed at a given time in order to show how closely the programs are related to one another. The cluster processor 825 automatically queries the data structure in memory 820 to identify all unique programs available during a given time period and identifies these programs as the Sample Set of Available Programs. The cluster processor 820 further queries the data structure in memory 820 to identify a set of attributes for use in calculating a distance vector defining how closely each unique program is related to another unique program. The identified set of attributes are known as the Complete Set of Attributes wherein each attribute is one dimension of relatedness. The cluster processor 825 automatically calculates a distance vector for each program using values associated with each attribute of the Complete Set of Attributes. The calculated distance vectors are used as input to a clustering algorithm to generate at least one cluster identifying the n-dimensional relatedness of all of the programs in the Sample Set of Available Programs, wherein n is the number of attributes contained in the Complete Set of Attributes. An exemplary algorithm executed by the cluster processor 825 is discussed above with respect to FIG. 2.

Data representing the at least one cluster calculated by the cluster processor 825 is provided to a user interface (UI) display processor 840. UI display processor 840 automatically formats the at least one cluster data for use as an electronic program guide according to a predetermined format (for example as shown in any of FIGS. 4 and/or 7) and causes the clustered electronic program guide data to be displayed on at least one of the primary display device 805 and the secondary display device 845 which is separate and different from a primary display device 805. The UI display processor 840 is responsive to a control signal generated by a user requesting display of the clustered electronic program guide data.

In one embodiment, the UI display processor 840 may provide the formatted user interface to the internet interface 830 which functions as a webserver and allows a browser executing on the secondary display device 845 to be pointed to a hosted user interface allowing user access thereto. Once presented on the secondary display device 845, a user may browse and navigate the data items in the clustered electronic program guide in order to view and/or select programs that interests them.

In one embodiment, the controller 800 may automatically take into account user subscription service information to determine if a respective program in the Sample Set of Available Programs is viewable by the user. For example, if the respective program is determined to be located on a premium channel and the user's subscription does not allow access to the particular channel, the system may automatically append the respective program identifier (e.g. icon) with a message telling the user that this content is available and related to certain other programs but is unavailable to the particular user due to content rights restrictions. Additionally, the message may also include information and/or a link enabling the user to modify service subscription so the respective program/content can be viewed by the user. In another embodiment, if content is not within a user's subscription level, the controller 825 may engage the internet interface 830 to search external data sources 835 including content providers to determine if the program is available from another source to which the user does have access. For example, if the program is located on an unavailable premium channel, the system may search HULU® or FANCAST® for the program and provide the source to the user on the secondary display device 845 in the form of a link viewable in a web browsing application.

In another embodiment, the at least one cluster data provided to the UI display processor 840 may also include data representing the each attribute in the Compete Set of Attributes that was used as input as part of the clustering algorithm. The attribute data may be formatted for display along with the at least one cluster data on the primary display device 805. Alternatively, the attribute data may be formatted for display to a user on the secondary display device 545. In a further embodiment, the UI display processor 840 may format the attribute data to enable selective modification thereof in response to user action. For example, the attribute data may be formatted to include user selectable image elements that enable the user to selectively remove at least one attribute from the complete set of attributes or selectively modify a value associated with the at least one attribute that is used in the clustering calculation (e.g. weighting one attribute more heavily than another). In response to receiving a modification signal from a user modifying at least one attribute of the Complete Attribute Set, the cluster processor 825 automatically executes the clustering algorithm to re-cluster and determine the relatedness of the Sample Set of Available Programs based on the modified Complete Attribute Set and provides the modified re-clustered data to the UI display processor 840 for display thereof.

The controller 800 further includes a navigation processor 827 that may be coupled to the cluster processor 825 and the UI display processor 840. The navigation processor 827 is able to selectively receive navigation signals via the UI display processor 840 that are generated by a user, for example using a remote control (not shown). The navigation signals include navigation information enabling navigation between a plurality of clusters generated by cluster processor 825 and displayed via UI display processor 840 on at least one of the primary display device 805 and secondary display device 845. Additionally, navigation information may enable a user to navigate a subset the Sample Set of Available Programs that are contained within a respective cluster generated by the cluster processor 825. Exemplary navigation information may be generated in accordance with the algorithms provided in FIGS. 5 and 6. In response to receiving navigation information from a user, the Sample Set of Available Programs may be modified and re-clustered by cluster processor 825 in order to provide a more detailed view of related programs in a particular cluster. Additionally, in response to receiving a navigation signal selecting a different cluster to be viewed, a set of representative programs that are more closely related based on the n-dimensional distance calculation may be provided to the UI display processor 840 for display on at least one of the primary display device 805 and secondary display device 845.

In another embodiment, the system may be embodied in a server responsible for serving a set of users. In this embodiment, the server executes the attribute search and clustering algorithms described above and provides the clustered program data to users over a communication network to reduce the bandwidth and processing power needed to perform a full search of all of the possible content information and content provider sources and the associated clustering. In response to a request to display content guide information, the set top box may automatically execute an application that initiates the search in the database of the server for clustered program guide information thus reducing the amount of processing power, bandwidth and time required to provide the user with a clustered content guide information.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims.

The invention claimed is:

1. A method of providing a content guide identifying a spatial relationship between the elements in the content guide, the method performed by a controller, the method comprising:
    a. receiving, by the controller, electronic program guide data;
    b. parsing the received electronic program guide data to identify a plurality of programs listed in the electronic program guide and data corresponding to sets of program description attributes, wherein each set of program description attributes corresponding to a respective one of the identified programs;
    c. determining a relationship between each identified program based on the sets of the program description attributes;
    d. generating at least one cluster including ones of the plurality of identified programs based on the determined relationship; and
    e. generating, by a user interface display processor, a user interface display image representing a clustered content guide and including the at least one generated cluster enabling a user to view the relationship of the plurality of programs, wherein the user interface display image contains a sliding bar to selectively determine, in real-time, a value that corresponds to a weight of one of the sets of program description attributes enabling a changing of spacing of the at least one generated cluster.

2. The method of claim 1, further comprising the steps of: displaying the content guide in a first display and displaying simultaneously a portion of the content guide in a second display.

3. The method of claim 1, wherein
a respective one of the program description attributes in the sets of the program description attributes represents one dimension of relatedness; and
the programs included in the generated at least one cluster represent an n-dimensional relationship to one another, where n is the number of program description attributes used in a clustering calculation.

4. The method of claim 1, wherein the step of determining further comprises:
selecting attributes associated with the identified plurality of programs for use in calculating a spatial distance between respective ones of the plurality of programs based on the selected attributes, the spatial distance representing a level of relatedness of a respective program to all other programs of the plurality of programs;
generating a value representing the spatial distance based on the selected attributes; and
storing the spatial distance value for respective ones of the plurality of programs for use in a clustering calculation.

5. The method of claim 1, further comprising:
applying a correction algorithm to the at least one generated clusters enabling the at least one generated cluster to be displayed in a two dimensional display image.

6. The method of claim 1, further comprising:
identifying a respective cluster of the at least one generated cluster as a node;
selecting a program contained in the respective cluster as a representative program for the node; and
providing data representing the representative program for the node to the user interface generator for inclusion in the spatial content guide display image.

7. A system for providing a content guide identifying a spatial relationship between elements in the content guide, the system comprising:
a receiver that receives electronic program guide data;
an attribute processor that parses the received electronic program guide data to identify a plurality of programs listed in the electronic program guide and data corresponding to sets of program description attributes, wherein each set of program description attributes corresponding to a respective one of the identified programs;
a cluster processor that determines the relationship between each identified program based on the sets of the program description attributes and generates at least one cluster including ones of the plurality of identified programs based on the determined relationship;
a user interface display processor that generates a user interface display image representing a clustered content guide and including the at least one generated cluster enabling a user to view the relationship of the plurality of programs, wherein the user interface display image contains a sliding bar to selectively determine, in real-time, a value that corresponds to a weight of one of the sets of program description attributes enabling a changing of spacing of the at least one generated cluster.

8. The system of claim 7, wherein the content guide is displayed in a first display and a subset of the content guide is displayed simultaneously in a second display.

9. The system of claim 7:
a respective one of the program description attributes in the sets of the program description attributes represents one dimension of relatedness; and
programs included in the generated at least one cluster represent an n-dimensional relationship to one another, where n is the number of program description attributes used in a clustering calculation.

10. The system of claim 7, wherein
the attribute processor selects attributes associated with the plurality of identified programs for use in calculating a spatial distance between respective ones of the plurality of identified programs based on the selected attributes, the spatial distance representing a level of relatedness of a respective program to all other programs of the plurality of identified programs, generates a value representing the spatial distance based on the selected attributes, and stores the spatial distance value for respective ones of the plurality of identified programs for use in a clustering calculation.

11. The system of claim 7, wherein the cluster processor applies a correction algorithm to the at least one generated clusters enabling the at least one generated cluster to be displayed in a two dimensional display image.

12. The system of claim 7, wherein the cluster processor identifies a respective cluster of the at least one generated cluster as a node and selects a program contained in the respective cluster as a representative program for the node and provides data representing the representative program for the node to the user interface generator for inclusion in the spatial content guide display image.

* * * * *